Figures 1, 2, 3:
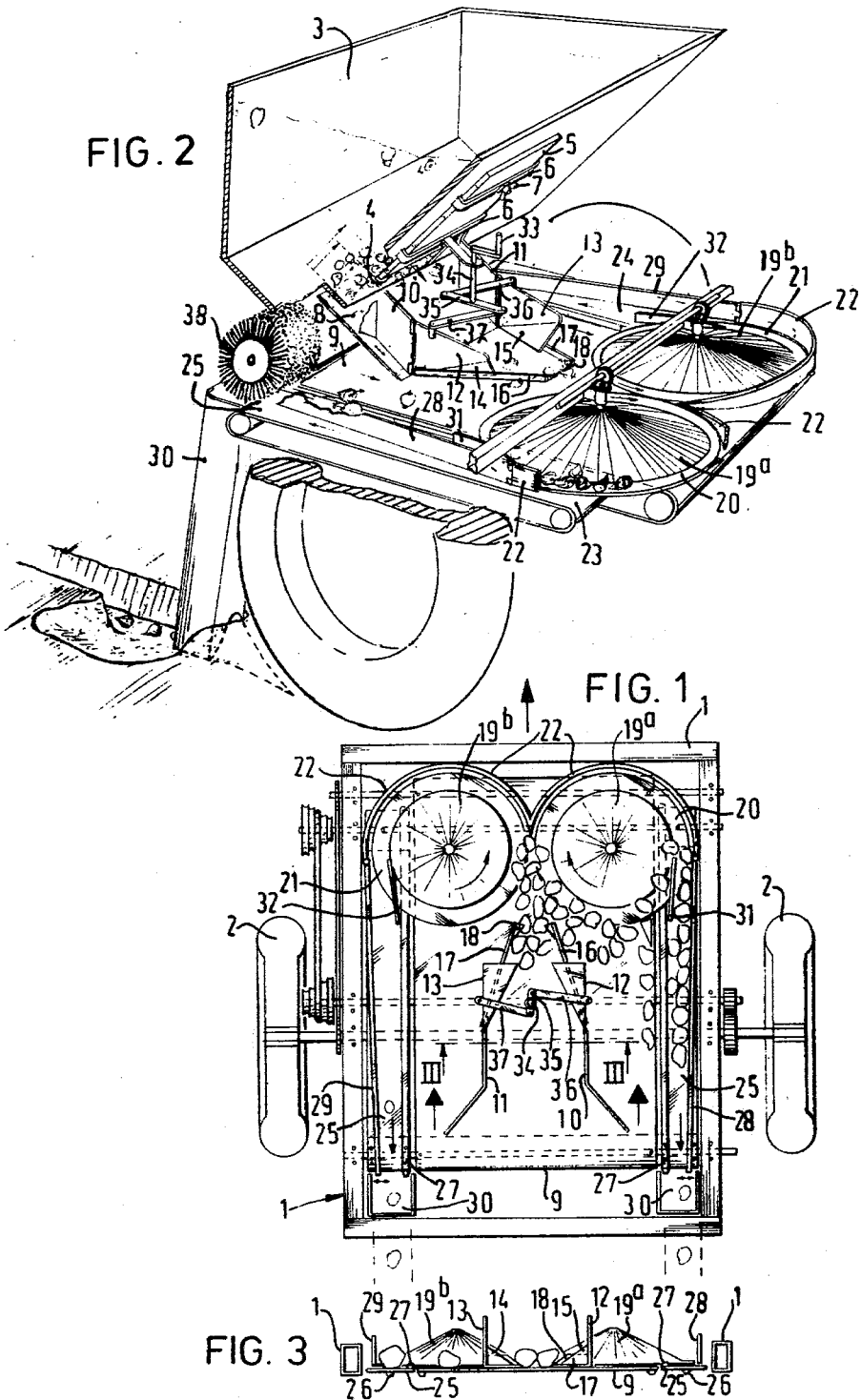

United States Patent [19]

Koning

[11] 4,193,523
[45] Mar. 18, 1980

[54] PLANTING MACHINE FOR POTATOES, BULBS OR SIMILAR SEED CROP

[76] Inventor: Nicolaas P. Koning, Reviusstraat 118, Alkmaar, Netherlands

[21] Appl. No.: 879,513

[22] Filed: Feb. 21, 1978

[30] Foreign Application Priority Data

Feb. 21, 1977 [NL] Netherlands .......................... 7701847

[51] Int. Cl.² .......................... B67D 5/52; A01C 9/08
[52] U.S. Cl. ..................................... 222/254; 111/77; 198/445; 222/272
[58] Field of Search ....................... 221/225, 236, 237; 222/254, 272, 330, 342, 415, 408; 198/445, 454, 453, 836; 111/77; 214/519

[56] References Cited

U.S. PATENT DOCUMENTS

| | | | |
|---|---|---|---|
| 2,053,390 | 9/1936 | Bateman et al. .................. | 222/254 X |
| 2,609,942 | 9/1952 | Kofoid ............................. | 198/454 X |
| 3,282,464 | 11/1966 | Kohl et al. ....................... | 221/225 X |

Primary Examiner—Robert J. Spar
Assistant Examiner—Edward M. Wacyra
Attorney, Agent, or Firm—John P. Snyder

[57] ABSTRACT

A planting machine for potatoes or similar crop comprising a device for feeding the potatoes to the planting foot being formed by a conveyor belt having above it two conical discs with a flat outer rim rotating in opposite senses and located side by side, wherein at the side of the conveyor belt conveying members are movable in opposite direction and extend by their pick-up ends beneath the discs, being provided pick-up members causing the potatoes on the flat rim portion to slide off the disc onto the conveying members, the circumferential speed of the discs exceeding the speed of the conveying members.

13 Claims, 9 Drawing Figures

U.S. Patent  Mar. 18, 1980  Sheet 1 of 2  4,193,523

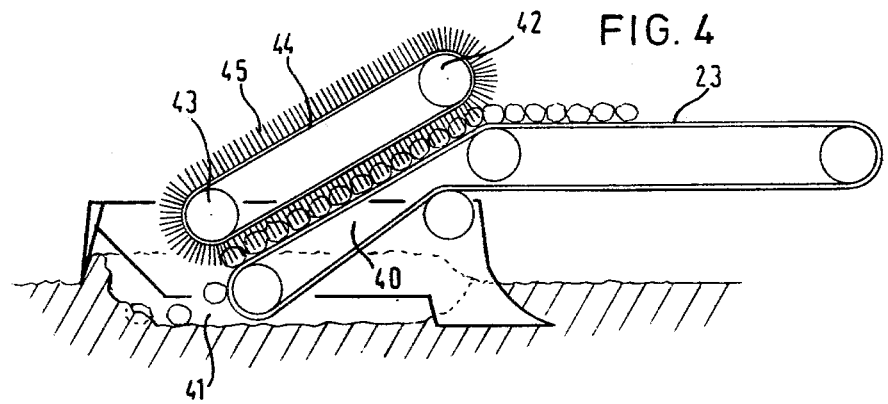
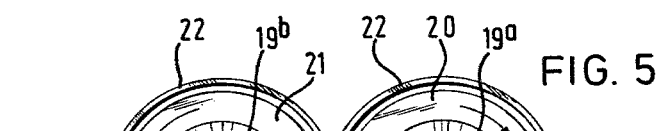
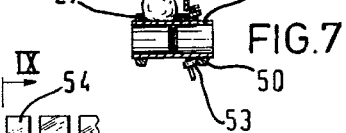
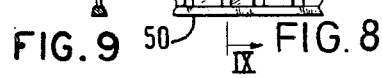
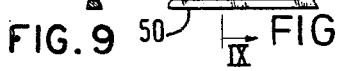

PLANTING MACHINE FOR POTATOES, BULBS OR SIMILAR SEED CROP

The invention relates to a planting machine for potatoes, bulbs or similar seed crop comprising a hopper and a conveying and distributing device adjoining the outlet of said hopper for feeding the potatoes or the like to the planting foot. The invention has for its object to provide a planting machine of the kind set forth, which ensures a particularly uniform distribution of the seed potatoes or the like, even if the seed potatoes have different sizes and if the shape of the seed crop is irregular. A further object is to provide a planting machine in which the potatoes, bulbs or similar seed crop are treated with such care that even previously germinated potatoes can be satisfactorily handled.

According to the invention the conveying and distributing device is formed by a conveyor belt extending beneath the outlet port of the hopper and having above it two discs rotating in opposite senses and being located side by side adjacent one another, said discs having the shape of an obtuse cone with an adjoining, annular, flat outer rim located just above the conveying run of the belt, the adjacent parts of the discs moving in the same direction as the conveyor belt, said discs being surrounded on the side remote from the hopper through a circumferential angle of about 180° with a slight interspace by an upright rim, whilst at the side of the conveyor belt there are arranged conveying members moving in the opposite sense and extending by their pick-up ends beneath the discs, by the outer edge remote from the conveyor belt beyond the outer edge of a disc and at their delivery ends above the planting foot, pick-up members being provided to cause the potatoes or the like lying on the flat rim portion of each disc to slide off the disc onto the conveying members moving opposite the direction of movement of the conveyor belt, whilst the linear circumferential speed of the discs exceeds the linear speed of the conveying members. Such a planting machine has a particularly simple construction and is readily monitored, since the distributing and conveying operations can be observed by the operator.

According to the invention in an effective embodiment the linear circumferential speed of the discs may be 25 to 30% higher than the linear velocity of the conveying members.

According to the invention the upright rim surrounding the discs may be joined at the outer ends by a plate pivoted thereto and extending in the direction of the conveying members and forming an adjustable guide for the potatoes or the like on the conveying members.

According to the invention an elastic rope can be lying below the plate pivoted to the upright rim, such rope moving together with the conveying surface. This has the advantage that potatoes, bulbs or similar crops are guided by guide surfaces moving together with the conveying members, said guide surfaces belonging to the rope. This makes the possibility of destruction of the germs smaller.

According to the invention the pivoting plate can be provided with guide rollers for the rope, such rollers supporting the rope in inward direction, and whereas below the conveying members a stationary roller can be arranged, said stationary rollers guiding the return part of the rope in outward direction. This is a very simple embodiment in which is taken care that the rope always has the same position as the pivoting plate.

According to the invention the rope can be provided with upright parts which replace partly or fully the pivoting plate. In such an embodiment it is prevented that the potatoes, bulbs and the like are contacting stationary surfaces. All the guiding surfaces are moving completely. The pivoting plate can then support the upright parts of the ropes, said upright parts providing the guidance of the potatoes and the like.

Moreover, in accordance with the invention there may be provided a strip-shaped pick-up member terminating in a tip and extending approximately in the direction of the conveying members, the top touching the circle forming the transitional line between the conical and flat portions of the discs. If too many potatoes or the like are lying on a disc, part thereof may turn with the disc across the pick-up member owing to the tip touching the transitional circle. If not too many potatoes are present, they are all conveyed to the conveying members by the co-operation of the adjustable guide with the tip-shaped pick-up member.

According to the invention an elastic disc can make a sharp angle with the horizontal plane and touch the flat portion of the conical disc, whereas the intersection of the geometrical plane of the elastic disc and the flat portion extends approximately in the direction of the conveying members. So in this embodiment one has the important advantage that the discs start to rotate as a result of the friction and there will be no braking influence on the potatoes and the like.

If more potatoes are fed by the rotating discs to the conveying members than the latter are capable of processing, the potatoes or the like arrive at the conveyor belt, which feeds them again to the rotating discs.

According to the invention an automatic adaptation of the feed of potatoes or the like from the hopper to the quantity delivered by the conveying members can be obtained. According to the invention the outlet of the hopper is provided to this end with two adjustable, door-shaped flaps, the lower edges of which can swing along the surface of the conveyor belt, whilst in the open position they converge in the direction of movement of the belt, whilst in line with the flaps, near the edges adjacent the conveyor belt, there are arranged two resilient prolongations, which can deflect when touching potatoes or the like lying on the conveyor belt. If the rotating discs feed potatoes or the like back to the feeding belt, these potatoes come into contact with the outer side of the resilient prolongations, which thus deflect inwardly and brake the supply of potatoes or the like from the hopper. Consequently, with the resilient flaps only a coarse adjustment is required.

According to the invention the lower rim part of the flaps may be bent over in an inclined position so that the flaps join by an inwardly sloping surface the surface of the conveyor belt, whilst the height of the sloping surface increases towards the free ends of the flaps. It is thus ensured that potatoes or the like are supplied as far as possible at the centre and only when the supply increases, the potatoes or the like are retained by the ascending, inclined surface.

According to the invention a similar structure is provided for the resilient prolongations of the flaps, since they are provided at the end with an inwardly sloping surface, the height of which increased from zero to a maximum in the direction of conveyance of the potatoes or the like.

Finally, in accordance with the invention a roller provided with brush hairs or the like may be arranged above the delivery end of each conveying member, the roller being driven with such a speed that the linear circumferential speed exceeds that of the conveying member. With such a construction of the planting machine a uniform supply of irregularly shaped seed crop is particularly enhanced.

The falling velocity of e.g. a potatoe in the planting foot is not defined and depends of the dimensions and the shape of the potatoes. With a different falling velocity the regular distribution of the potatoes in the furrow is in danger.

According to the invention the conveying members can extend to a point just over the furrow and above the conveying surface of the conveying members can be provided a driven belt with brush hairs or the like, such that the brush hairs hold the potatoes or the like lying on the conveying surface till the moment that they leave the belt. In such an embodiment the potatoes or the like are held till the very last moment and the velocity of the potatoes in relation to each other is completely defined. Under all circumstances a regular distribution of the potatoes in the furrow is obtained.

The invention will be described more fully hereinafter with reference to one embodiment shown in the drawing, in which FIG. 1 is a plan view of a planting machine in accordance with the invention, FIG. 2 is a perspective view of the planting machine of FIG. 1, FIG. 3 is a schematic sectional view taken on the line III—III in FIG. 1.

FIG. 4 is the end part of the planting machine schematically in a side view in another embodiment, FIG. 5 is a plan view of the machine in another embodiment, whereas the discs with the conveying members are schematically indicated, FIG. 6 is a sectional view according to the line VI—VI in FIG. 5, FIG. 7 is a sectional view according to the line VII—VII in FIG. 5, FIG. 8 is a detail of a modified form of the rope, FIG. 9 is a cross section according to the line IX—IX in FIG. 8.

The planting machine shown in FIG. 1 comprises a frame 1 having wheels 2. The frame 1 may be coupled with a tractor in a manner not shown. A hopper 3 is arranged on the frame 1. The hopper 3 has an outlet port 4, which can be closed with the aid of a slide 5, which is guided in brackets 6 along the wall of the hopper 3 and which can be fixed in a given position by means of wing nuts 7. In line with the bottom wall of the hopper 3 is arranged a movable plate 8, which can be caused to vibrate in a reciprocatory fashion in a manner not shown in order to avoid jamming of the outflow of seed material from the hopper 3. Beneath the outlet port of the hopper is arranged a conveyor belt 9. The lower edge of the plate 8 closely adjoins the surface of the conveyor belt 9. On either side the outlet port 4 has partitions 10 and 11 provided with pivotable flaps 12 and 13 respectively. The flaps 12 and 13 have lower, inwardly inclined portions 14 and 15 respectively. The lower edges of the portions 14 and 15 closely overlie the conveyor belt 9. At the edges of the portions 14 and 15 the flaps 12 and 13 are prolonged by resilient strips 16 and 17 respectively. At the ends said strips have an upwardly inclined surface shown in FIG. 2 for the strip 17 and designated by 18. Above the belt 9 there are arranged two conical discs 19a and 19b. The conical discs have annular, flat outer rims 20 and 21 respectively. The rims 20 and 21 are adjacent one another at their outer circumferences. The discs 19a and 19b rotate in opposite senses so that the adjacent peripheral portions 20 and 21 move in the same direction as the conveyor belt 9. The discs 19a and 19b are surrounded by an upright rim 22 through an angle of about 180°. On either side of the conveyor belt 9 there are disposed conveying members 23 and 24. In the embodiment shown the conveying members 23 and 24 are formed, for example, by a flat belt 25 having a control-rope 26 and a profile 27 welded thereon.

The rim 22 surrounding the discs 19a and 19b is joined at the ends by adjustable partitions 28 and 29. The partitions 28 and 29 extend above the belts 25, which is particularly shown in FIG. 3. Together with the welded-down profile 27 the partitions 28 and 29 may form a narrowing space, which ensures that the seed potatoes or the like are fed with certainty in a single row to the planting feet 30 located at the delivery ends of the conveying members 23 and 24.

Above the conveying members 23 and 24 strip-shaped parts 31 and 32 extend in the direction of length. The parts 31 and 32 terminate in a tip and touch the transitional circle between the conical parts of the discs 19a and 19b and the flat rim portions 20 and 21 respectively.

The flap-like doors 12 and 13 can be displaced by means of a crank 33. By means of the crank 33 a shaft 34 is turned, which is journalled in a part rigidly secured to the hopper 3. The shaft 34 holds an arm 35 extending to both sides and having its ends connected through rods 36 and 37 with the doors 12 and 13 respeicitevely. When the shaft 34 is turned, the doors 12 and 13 can be closed to a greater or lesser extent.

Above the delivery end of the belts 25 and the planting feet 30 are arranged rollers 38 provided with brush hair. These rollers 38 are driven with such a speed that their linear circumferential speed is higher than the speed of the belt 25.

The device operates as follows. From the hopper 3 potatoes or the like roll onto the belt 9. The belt 9 carries along the potatoes and through the openings formed by the doors 12, 13 and the resilient strips 16, 17 the potatoes are allowed to pass to the discs 19a and 19b. The discs 19a, 19b carry potatoes on the rim portions 20, 21, which potatoes are guided via the partition 22. The flat portions 20 and 21 feed the potatoes to the space between the strip-shaped parts 31 and 32 and the pivotable parts 28 and 29 respectively. If too many potatoes are fed to said space, part of them will be guided back by the members 31 and 32 to the conveyor belt 9, which delivers them again to the rotating discs 19a and 19b. If too many potatoes or the like are supplied, they will exert pressure on the outside on the resilient strips 16 and 17 so that the opening between the ends of the strips 16 and 17 is narrowed, so that fewer potatoes or the like are admitted to the discs 19a and 19b. Thus, after some time a state of equilibrium will be re-established between the quantity fed to the discs and the quantity delivered by the conveying members 23 and 24. Consequently, the flaps 12 and 13 need not be adjusted very accurately, since adaptation is performed automatically. The operation of the machine is readily monitored since the whole process of feed and distribution of the potatoes or the like can be observed by the operator of the machine. Owing to the rollers 38 a uniform feed of seed crop to the planting feed 30 is ensured under any condition.

The conveying members 23 are in the embodiments according to FIG. 4 extended in backward direction with a part 40. This part 40 extends to a point in the furrow 41. Above the part 40 is arranged a belt 44 guided around rollers 42 and 43, such belt provided with brush hairs 45. The brush hairs 45 hold the potatoes lying on the conveying members 23 during the time they are lying on the extended part 40 of the conveying members. This has the effect, that one is sure that the potatoes delivered by the conveying members are lying on the same distance in relation to each other in the furrow 41.

FIG. 5 shows the conical discs 19a and 19b with the adjoining conveying members 23 and 24. As is indicated for the disc 19b the adjustable plate 29 adjoins pivotally the upright rim 22. Below the plate 29 lies a rope 50 which is surrounding the conveying member 23 in the shape of an endless belt 25. Supporting discs 51 and 52 support the rope 50 in inward direction. At the lower side below the return part of the belt 25 is provided a stationary guide roller 53, as is indicated for the conveying members 24. For the conveying members 23 this roller 53 is omitted to make the drawing clearer. The roller 53 guides the rope 50 in outward direction such that this rope arives again below the pivoting point of the plate 29. Owing to the roller 53 and the seed crops on the belt 25 the rope 50 is likely to be displaced in outward direction. On the upper side of the belt this is prevented by the rollers 51 and 52. Owing to the rope 50 which is moving together with the belt 25 the potatoes and the like which are conveyed by the belt 25 have less possibilities to contact the stationary plate 29 as they are supported by the rope 50.

In the embodiment according to the FIGS. 8 and 9 the rope 50 is provided with protruding parts 54. These parts 54 can move along the plate 29 and then it is impossible that the potatoes or the like contact the stationary surfaces.

In the embodiment according to FIG. 5 the striplike members 31 and 32 are replaced by the discs 55 and 56. The discs 55 and 56 are of elastic material and can rotate freely. They are in contact with the flat portions 21 of the conical discs. The plane of the discs extends substantially in the direction of the conveying members 23 and 24. The discs rotate as a result of the touching of the flat portions 21 of the conical discs. Also in this embodiment the potatoes or the like can only contact moving guiding surfaces. The possibility of destruction of the germs becomes very small.

What I claim is:

1. A planting machine for potatoes, bulbs or similar seed crop comprising a hopper and a conveying and distributing device adjoining an outlet port of said hopper for feeding the potatoes or the like to the planting foot, characterised in that the conveying and distributing device is formed by a conveyor belt extending beneath the outlet port of the hopper and having above the conveyor belt two discs rotating in opposite senses and being located side by side adjacent one another, said discs having the shape of an obtuse cone with an adjoining, annular, flat outer rim located just above the conveying surface of the belt, the adjacent parts of the discs moving in the same direction as the conveyor belt, said discs being surrounded on the side remote from the hopper through a circumferential angle of about 180° with a slight interspace by an upright rim, and at the opposite sides of the conveyor belt conveying members are arranged to be movable in opposite direction to that of the conveyor belt, said conveying members having pick-up ends lying beneath the outer rims of the respective discs and delivery ends lying above the planting foot, there being provided pick-up members on said conveying members causing the potatoes or the like lying on the flat rim portion of each disc to slide off the disc onto the conveying members wherein the linear circumferential speed of the discs exceeds the linear speed of the conveying members.

2. A planting machine as claimed in claim 1 characterised in that the linear circumferential speed of the discs is 25 to 30% higher than the linear velocity of the conveying members.

3. A planting machine as claimed in claim 1 or 2 characterised in that the upright rim surrounding the discs is joined at the outer ends by a plate pivoted thereto and extending in the direction of the conveying members and forming an adjustable guide for the potatoes or the like on the conveying members.

4. A planting machine as claimed in claim 3, characterised in that below the plate pivoted to the upright rim is lying an elastic rope, such rope moving together with the conveying surface.

5. A planting machine as claimed in claim 4, characterised in that the pivoting plate is provided with guide rollers for the rope, such rollers supporting the rope in inward direction, and that below the conveying members a stationary roller is arranged, said stationary rollers guiding the return part of the rope in outward direction.

6. A planting machine as claimed in claim 5, characterised in that the rope is provided with upright parts.

7. A planting machine as claimed in claim 1 characterised in that a strip-shaped pick-up member terminating in a tip is provided, which extends approximately in the direction of the conveying members, the top touching the circle forming the transitional line between the conical and flat portions of the discs.

8. A planting machine as claimed in claim 1 characterised in that an elastic disc makes a sharp angle with the horizontal plane and touches the flat portion of the conical disc, whereas the intersection of the geometrical plane of the elastic disc and the flat portion extends approximately in the direction of the conveying members.

9. A planting machine as claimed in claim 1 characterised in that the outlet of the hopper is joined by two adjustable, door-shaped flaps, which are adapted to turn their lower edges along the surface of the conveyor belt, and which converge in the opened state, in the direction of movement of the belt, and in that in line with the flaps, near the edges adjacent the conveyor belt, two resilient prolongations are provided, which can deflect upon contact with potatoes or the like lying on the conveyor belt.

10. A planting machine as claimed in claim 9, characterised in that the lower peripheral part of the flaps is bent over in an inclined position such that the flaps join by the inwardly sloping surface the surface of the conveyor belt, and in that the height of the sloping surface increases towards the free ends of the flaps.

11. A planting machine as claimed in claim 9 characterised in that the resilient prolongations of the flaps are provided at the ends with an inwardly sloping surface, the height of which increases from zero to a maximum in the travelling direction of the potatoes or the like.

12. A planting machine as claimed in claim 1 characterised in that a roller provided with brush hairs or the like is arranged above the delivery end of each conveying member, and is driven with such a speed that the linear circumferential speed exceeds that of the conveying member.

13. A planting machine according to claim 1, characterised in that the conveying members extend to a point just over the furrow and that above the conveying surface of the conveying members is provided a driven belt with brush hairs or the like, such that the brush hairs hold the potatoes or the like lying on the conveying surface till the moment that they leave the belt.

* * * * *